United States Patent [19]

Kamura et al.

[11] Patent Number: 4,658,329

[45] Date of Patent: Apr. 14, 1987

[54] GAS-INSULATED SWITCHGEAR APPARATUS

[75] Inventors: Yukio Kamura, Hitachi; Seizo Nakano, Mito; Tohru Tsubaki, Hitachi; Satoshi Miwada, Toukai; Naoki Amano, Hitachi, all of Japan

[73] Assignee: Hitachi, Ltd., Tokyo, Japan

[21] Appl. No.: 710,390

[22] Filed: Mar. 11, 1985

[30] Foreign Application Priority Data

Mar. 9, 1984 [JP] Japan .................................. 59-43929

[51] Int. Cl.⁴ ............................................ H02B 13/00
[52] U.S. Cl. ..................................... 361/332; 361/333
[58] Field of Search ............................... 200/50 AA; 361/333–339, 341

[56] References Cited

U.S. PATENT DOCUMENTS

| | | | |
|---|---|---|---|
| 2,767,265 | 10/1956 | Davidson | 361/336 |
| 4,417,111 | 11/1983 | Kishi et al. | 200/148 F |
| 4,527,220 | 7/1985 | Boersma et al. | 361/332 |

Primary Examiner—A. D. Pellinen
Assistant Examiner—Gregory P. Thompson
Attorney, Agent, or Firm—Antonelli, Terry & Wands

[57] ABSTRACT

A gas-insulated switchgear apparatus including a three-phase circuit breaker, a three-phase disconnecting switch and a cable head, with the disconnecting switch and the cable head being accommodated in a cable head housing. To minimize the size of the disconnecting switch, movable insulators, connected to movable conductors, and stationary insulators, supporting connecting conductors, are arranged so that the movable and stationary insulators form triangles disposed substantially in the same plane with the respective triangles being inverted in relation to each other.

8 Claims, 6 Drawing Figures

GAS-INSULATED SWITCHGEAR APPARATUS

BACKGROUND OF THE INVENTION

The present invention relates to a gas-insulated switchgear or switching apparatus, and more particularly, to a gas-insulated switchgear or switching apparatus which has a three-phase disconnecting switch arranged in a cable head housing.

In a gas-insulated switching or switchgear apparatus, a suitable gas such as Sulphur Hexafluoride ($SF_6$), having excellent electric insulating properties, is contained within a gas-tight container or housing of metal, with the container or housing being grounded. A high voltage member is disposed within the container or housing in an electrically insulated relationship with respect to the container or housing through insulator means. By virtue of the fact that the electrically insulating gas ($SF_6$) is used for the electrical insulation of the high voltage member from ground, the distance required for the electrical insulation between the high voltage member and ground can be reduced as compared with air-insulated switching gear apparatuses. Therefore, the construction or insulation space of the switchgear apparatus can be remarkably considerably reduced.

Presently, in order to further reduce the construction or insulation space and to provide for an economical switching apparatus, it has been proposed in, for example, U.S. Pat. No. 4,262,323 to provide a gas insulated electrical apparatus wherein three-phase high voltage members including bus bar conductors are arranged in a common housing, with a cable head being provided for introducing electrical power from or to an external apparatus. A disconnecting switch is provided between the cable head and the circuit breaker, with the disconnecting switch being provided in a housing between the circuit breaker and the cable head.

A disadvantage of the above proposed construction resides in the fact that a considerable amount of space is required between the cable head and the circuit breaker; therefore, it is desirable to arrange the disconnecting switch in a housing of the cable head for reducing the space between the cable head and the circuit breaker.

In a three-phase disconnecting switch, there are many movable members and stationary members, and the high voltage members such as, for example, the bus bar conductors, are supported by insulators so that the high voltage members are insulated from the housing. Consequently, a problem arises as to how the disconnecting switch should be arranged or, more particularly, how the insulators should be arranged for reducing the overall size of the disconnecting switch.

The aim underlying the present invention essentially resides in providing a gas-insulated switchgear or switching apparatus having a smaller or reduced disconnecting switch disposed in a cable head housing of the switchgear apparatus.

More particularly, in accordance with advantageous features of the present invention, a gas-insulator switchgear apparatus is provided which includes a three-phase circuit breaker containing three-phase interrupting parts in a housing, a three-phase disconnecting switch connected to the circuit breaker, a cable head connected to the disconnecting switch, and a cable head housing in which the disconnecting switch and the cable head are accommodated. The disconnecting switch includes three-phase stationary conductors which are respectively electrically connected to the interrupting parts of the circuit breaker, and three-phase connecting conductors are respectively connected to the conductors of the cable head. The three-phase movable conductors are respectively slidably supported by the connecting conductors and are adapted to be respectively contacted to the stationary conductors. Movable insulators are respectively connected to the movable conductors, and stationary insulators respectively support the connecting conductors. The movable insulators and the stationary insulators are arranged so that the two types of insulators, namely, the movable insulators and stationary insulators, respectively form triangles in substantially the same plane, with one of the triangles being inverted relative to the other.

Advantageously, in accordance with further features of the present invention, the stationary insulators are supported by a common plate which is fixed to the cable head housing.

In accordance with still further features of the present invention, the movable insulators are supported by a T-shaped plate which is connected to an operating mechanism.

Advantageously, the stationary conductors are supported by an insulating spacer and grounding or earthing switch is provided in the cable head housing, with stationary contactors of the earthing or grounding switch being respectively mounted on the connecting conductors of the disconnecting switch.

Accordingly, it is an object of the present invention to provide a gas-insulated switchgear apparatus which avoids, by simple means, shortcomings and disadvantages encountered in the prior art.

SUMMARY OF THE INVENTION

Another object of the present invention resides in providing a switchgear apparatus having a disconnecting switch in a cable head housing which has a reduced or smaller overall size.

Yet another object of the present invention resides in providing a gas-insulator switchgear apparatus which is simple in construction and therefore relatively inexpensive to manufacture.

A still further object of the present invention resides in providing a gas-insulated switchgear apparatus which functions reliably under all operating conditions.

These and other objects, features and advantages of the present invention will become more apparent from the following description when taken in connection with the accompanying drawings which show, for the purposes of illustration only, one embodiment in accordance with the present invention.

DETAILED DESCRIPTION

Figure 1:
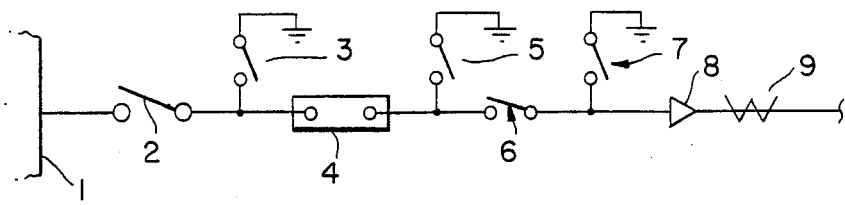
FIG. 1 is a schematic view of a gas-insulated switchgear apparatus.

Referring now to the drawings when like reference numerals are used throughout the various views to designate like parts and, more particularly, to FIG. 1, according to this figure, a gas-insulated switching or switchgear apparatus includes a circuit breaker 4 having one end connected to a bus bar 1 through a disconnecting switch 2 and another end connected to a cable head 8 through a disconnecting switch 6. Grounding or earthing switches 3, 5 are connected to each side of the circuit breaker 4 and a grounding switch or earthing switch 7 is connected to the cable head side of the disconnecting switch 6. A current transformer 9 is connected at the end of the cable head 8.

Figure 2:
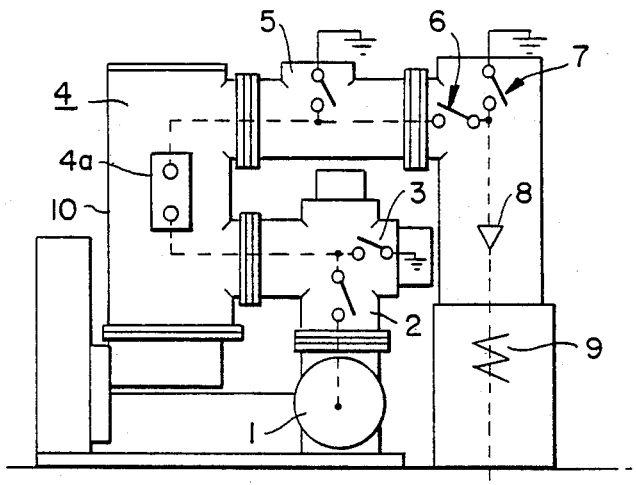
FIG. 2 is a schematic front view of a gas-insulated switchgear apparatus.

As shown most clearly in FIG. 2, the three-phase circuit breaker 4 is installed in a gas tight housing 10 having vertically arranged therein interrupting parts 4a, with two terminals drawn out from one side of the sealed housing 10. The three-phase gas circuit breaker of FIG. 2 is of the type disclosed in, for example, U.S. Pat. No. 4,417,111. The upper terminal is connected to the disconnecting switch 6 and then further to the cable head 8 with a grounding or earthing switch 5 being inserted or disposed between the upper terminal and the disconnecting switch 6. A further grounding or earthing switch 7 is disposed between the disconnecting switch 6 and the cable head 8, with a current transformer 9 being connected to the end of the cable head 8. A lower terminal of the circuit breaker 4 is connected to the bus bar 1 through a disconnecting switch 2 with an earthing or grounding switch 3 being inserted between the circuit breaker 4 and the disconnecting switch 2.

Figure 3:
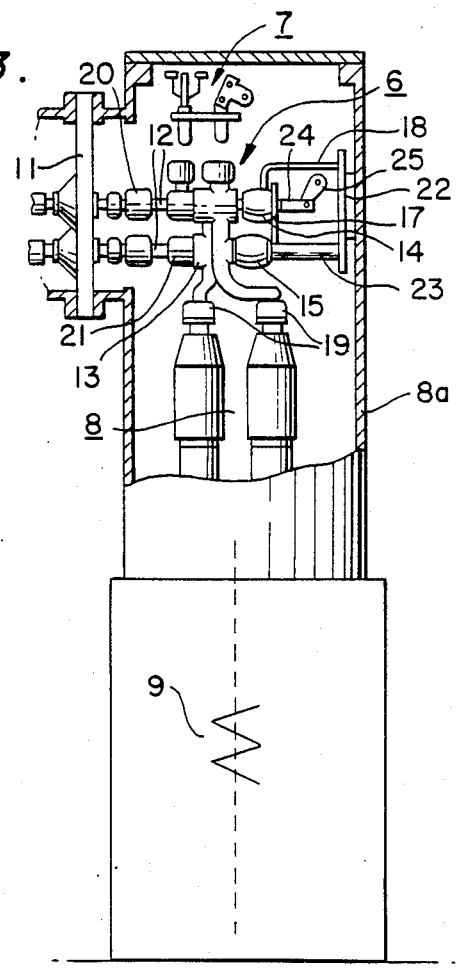
FIG. 3 is a partial cross-sectional view of an arrangement of a disconnecting switch in a cable head housing constructed in accordance with the present invention.

As shown in FIG. 3, the disconnecting switch 6 and ground switch 7, as well as the cable head 8 is disposed internally of the cable head housing 8a of the gas-insulated switching apparatus. The stationary conductors of the disconnecting switch 6 are connected to respective phase terminals (not shown) of a three-phase circuit breaker 4 and supported by an insulating spacer 11. The disconnecting switch 6 has three-phase movable conductors 12 which are adapted to move between the three-phase stationary conductors 20 on the stationary contact side and the three-phase connecting conductors 13 connected to the conductors 19 of the cable head 8, with the movable conductors 12 being each supported by the movable insulators 14 and being constructed so as to be freely movable. The three-phase connecting conductors 13 are each supported by the stationary insulators 15 and have terminals 21 which slidably support the movable conductors 12. With a disconnecting switch 6 having a construction as described hereinabove, a base plate 22 of a predetermined size is installed in the cable head housing 8a for supporting the stationary insulators 15. With regard to the specific construction of the disconnecting switch 6, as shown most clearly in FIGS. 4–6, the movable insulators 14U, 14V and 14W are fixed to a T-shaped plate 17, with the stationary insulators 15V, and 15W being mounted at the top of support bars 23 and the stationary insulator 15U being mounted to an L-shaped support member 18. The support bars 23 and L-shaped support member 18 are mounted on the base plate 22 which, in turn, is fixed to the cable head housing 8a. A lever 25 is attached, through a linkage mechanism 24, to the T-shaped plate 17 on which the movable insulators 14U, 14V, and 14W are mounted. The operating mechanism is comprised of elements 24, 25, and 26. An operating device (not shown) is coupled to the rotating shaft 26 of the lever 25 whereby, as the rotating shaft 26 of the lever is rotated by operation of the operating device, the movable insulators 14U, 14V, and 14W and the movable conductors 12U, 12V, and 12W, slidably supported in the terminals 21U, 21V, and 21W, are driven so as to make or break contact with the stationary conductors 20U, 20V, and an unillustrated stationary conductor for the W phase behind the stationary conductor 20V thereby enabling the performance of the desired functioning of the disconnecting switch 6.

Figure 5:
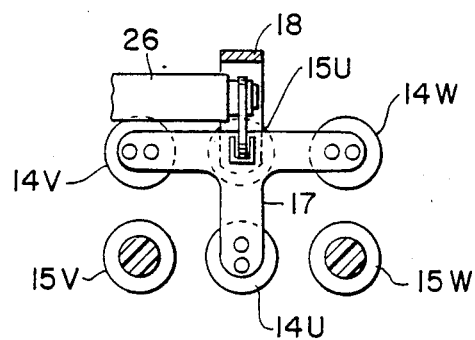
FIG. 5 is a cross-sectional detailed view taken in the direction of the arrows V—V in FIG. 4.
Figure 6:
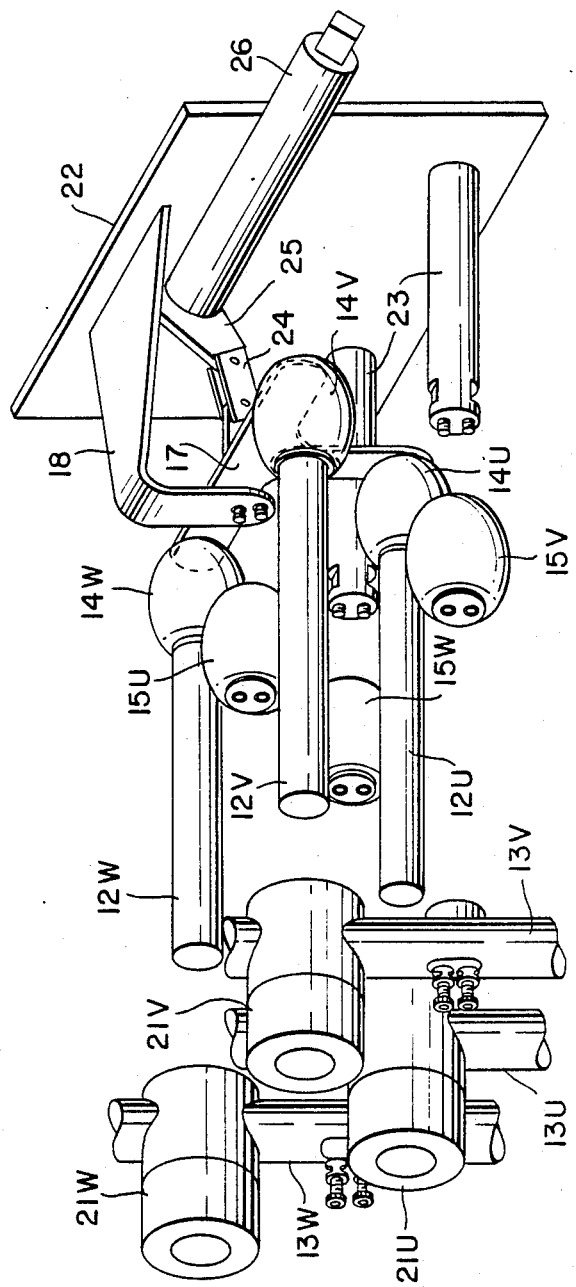
FIG. 6 is a perspective view of a portion of the gas-insulated switchgear of FIG. 4 in a disconnected position.

As shown most clearly in FIG. 5, the movable insulators 14U, 14V, and 14W fixed to the T-shaped plate 17 form the apices of a triangle, with the stationary insulators 15U, 15V, and 15W forming the apices of another triangle. As shown in FIG. 5, the triangle formed by the movable insulators 14U, 14V, and 14W and the triangle formed by the stationary insulators 15U, 15V, and 15W are inverted with respect to each other. The movable insulators 14U, 14V, and 14W and the stationary insulators 15U, 15V, and 15W are disposed so as to be substantially in the same plane in a closed state of the disconnecting switch 6. Consequently, a strength of the electrical field between the high voltage member, that is connecting conductors 13U, 13V, and 13W and the grounding or earthing part can be reduced and, consequently, the size of the movable insulators 14U, 14V, and 14W, as well as the size of the stationary insulators 15U, 15V, and 15W can be reduced. Moreover, a reassembly of the switching apparatus is relatively easy because the movable insulators 14U, 14V, and 14W are mounted on the common T-shaped plate 17 and the stationary insulators 15U, 15V, 15W are mounted on the same base plate 22 through the support bars 23 or L-shaped support member 18.

Figure 4:
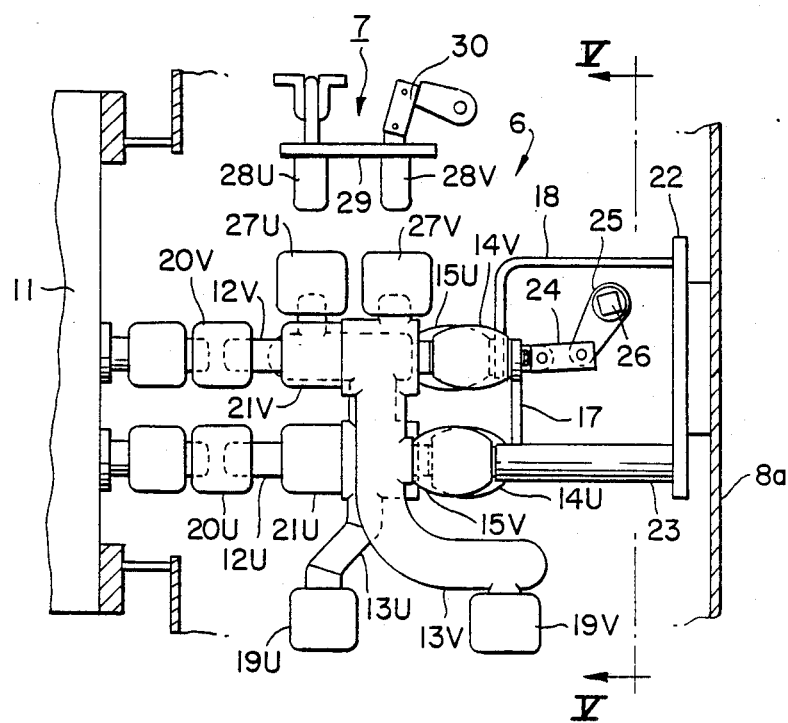
FIG. 4 is a partial cross-sectional view, on an enlarged scale, of a detailed of FIG. 3.

As also shown in FIG. 4, the ground or earthing switch 7 includes stationary contactors 27U, 27V and an unillustrated stationary contact for the W phase behind the stationary contact 27V respectively mounted on the upper end of the connecting condutor 13U, 13V, 13W and movable contactors 28U, 28V, and a further unillustrated movable contactor mounted to a plate 29 which is operable by an operating mechanism 30. When the disconnecting switch 6 is opened, the ground switch 7 is closed for grounding or earthing the conductors 19U, 19V and an unillustrated conductor for the W phase behind the conductor 19V of the cable head 8 connected to the connecting conductors 13U, 13V and 13W. Since the stationary contactors 27U, 27V and the unillustrated stationary contactor for the W phase of the ground switch 7 are mounted to the connecting conductors 13U, 13V and 13W, the ground switch is relatively compact in size.

By virtue of the construction described hereinabove, since the movable insulators 14U, 14V and 14W and the stationary insulators 15U, 15V, 15W are arranged so as to be disposed in two triangles inverted with respect to each other in substantially the same plane, it is possible to provide a gas-insulated switchgear apparatus with a disconnecting switch section which is considerably smaller in size than prior art switchgear apparatuses.

While we have shown and described several embodiments in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A gas-insulated switchgear apparatus comprising:
   a three-phase circuit breaker means;
   a housing means housing said three-phase circuit breaker means;
   a three-phase disconnecting switch means connected to said three-phase circuit breaker means;
   a three-phase cable head means connected to said three-phase disconnecting switch means; and
   a cable head housing means housing said three-phase disconnecting switch means and said three-phase cable head means, said three-phase disconnecting switch means including three stationary conductor means respectively electrically connected to corresponding phases of said three-phase circuit breaker means, three movable conductor means adapted to respectively contact said three stationary conductor means, three terminals slidably supporting said respective three movable conductor means, three connecting conductor means connecting said respective three terminals to corresponding phases of said three-phase cable head means, three movable insulator means respectively connected to said three movable conductor means and three stationary insulator means respectively supporting said three connecting conductor means, said three movable insulator means are disposed at apices of a first triangular configuration, said three stationary insulator means are disposed at apices of a second triangular configuration, and wherein said first and second triangular configurations formed of said movable and said three stationary insulator means occupy substantially the same plane with said first and second triangular configurations being inverted with respect to each other.

2. A gas-insulated switchgear apparatus according to claim 1, further comprising a base plate means fixed to said cable head housing means supporting said three stationary insulator means.

3. A gas-insulated switchgear apparatus according to claim 2, further comprising a T-shaped plate means supporting said three movable insulator means, and an operating mechanism connected to said T-shaped plate means.

4. A gas-insulated switchgear apparatus according to claim 3, further comprising an insulating spacer means supporting said three stationary conductor means.

5. A gas-insulating switchgear apparatus according to claim 4, further comprising a grounding switch means provided in said cable head housing means, said grounding switch means including three stationary contactor means respectively mounted on said three connecting conductor means of said three-phase disconnecting switch means.

6. A gas-insulated switchgear apparatus according to claim 1, further comprising a T-shaped plate means supporting said three movable insulator means, and an operating mechanism connected to said T-shaped plate means.

7. A gas-insulated switchgear apparatus according to claim 1, further comprising an insulating spacer means supporting said three stationary conductor means.

8. A gas-insulated switchgear apparatus according to claim 1, further comprising a grounding switch means provided in said cable head housing means, said grounding switch means including three stationary contactor means respectively mounted on said three connecting conductor means of said three-phase disconnecting switch means.

* * * * *